United States Patent
Nagamatsu

(10) Patent No.: US 9,036,072 B2
(45) Date of Patent: May 19, 2015

(54) IMAGE PROCESSING APPARATUS AND IMAGE PROCESSING METHOD

(71) Applicant: CANON KABUSHIKI KAISHA, Tokyo (JP)

(72) Inventor: Yasunari Nagamatsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/908,089

(22) Filed: Jun. 3, 2013

(65) Prior Publication Data
US 2013/0329124 A1 Dec. 12, 2013

(30) Foreign Application Priority Data
Jun. 8, 2012 (JP) ................ 2012-130864

(51) Int. Cl.
 *G03B 13/00* (2006.01)
 *H04N 5/232* (2006.01)
 *H04N 5/222* (2006.01)

(52) U.S. Cl.
 CPC ....... *H04N 5/23212* (2013.01); *H04N 5/23232* (2013.01); *H04N 5/23293* (2013.01)

(58) Field of Classification Search
 USPC .................. 348/346, 333.01–333.02, 333.12
 See application file for complete search history.

(56) References Cited

U.S. PATENT DOCUMENTS

| 8,559,705 | B2 * | 10/2013 | Ng ................................. | 382/162 |
| 8,704,916 | B2 * | 4/2014 | Imai .............................. | 348/239 |
| 2004/0125211 | A1 * | 7/2004 | Ishida ....................... | 348/207.99 |
| 2008/0080846 | A1 * | 4/2008 | Grip ................................ | 396/51 |
| 2011/0273369 | A1 * | 11/2011 | Imai et al. .................... | 345/158 |
| 2011/0273731 | A1 * | 11/2011 | Haikin et al. ................. | 358/1.9 |
| 2012/0013786 | A1 * | 1/2012 | Yasuda et al. ................ | 348/349 |
| 2012/0019703 | A1 * | 1/2012 | Thorn ...................... | 348/333.03 |
| 2013/0329068 | A1 * | 12/2013 | Hamanaka et al. ........ | 348/218.1 |
| 2014/0253760 | A1 * | 9/2014 | Watanabe et al. ............ | 348/239 |

FOREIGN PATENT DOCUMENTS

JP 2011-022796 A 2/2011

OTHER PUBLICATIONS

R. Ng, et al., "Light Field Photography with a Hand-Held Plenoptic Camera", Stanford Tech Report CTSR Feb. 2005.
Y. Boykov, et al., "Interactive Graph Cuts for Optimal Boundary & Region Segmentation of Objects in N-D Images", International Conference on Computer Vision, vol. 1, pp. 105-112, Jul. 2001.

* cited by examiner

*Primary Examiner* — Ngoc-Yen Vu
(74) *Attorney, Agent, or Firm* — Fitzpatrick, Cella, Harper & Scinto

(57) ABSTRACT

It is required to carry out a tapping operation on a display screen to adjust the focus in a case where refocus process is performed in shifting to a reproduction mode, so that a user has to do an extra work. An image processing apparatus obtains a multi-view image data obtained by image-capturing in a plurality of viewpoints. A mode indicating information on a target to be focused is set. A combined image data focused on the target is generated by executing image processing to the multi-view image data based on the set mode.

9 Claims, 14 Drawing Sheets

DEEP-FOCUS IMAGE

SELECT PEOPLE MODE FROM A VIEW DISPLAY SCREEN

DEEP-FOCUS IMAGE

SELECT PEOPLE MODE FROM A VIEW DISPLAY SCREEN

RESULT OF DISPLAY OF THE PEOPLE MODE

LANDSCAPE MODE

ANIMAL MODE

PEOPLE+LANDSCAPE MODE

DISPLAYED IMAGE ON THE DISPLAY SCREEN
BEFORE SWITCHING THE IMAGE (PEOPLE MODE)

DISPLAY ON THE DISPLAY SCREEN
UPON SWITCHING THE IMAGE TO ANOTHER

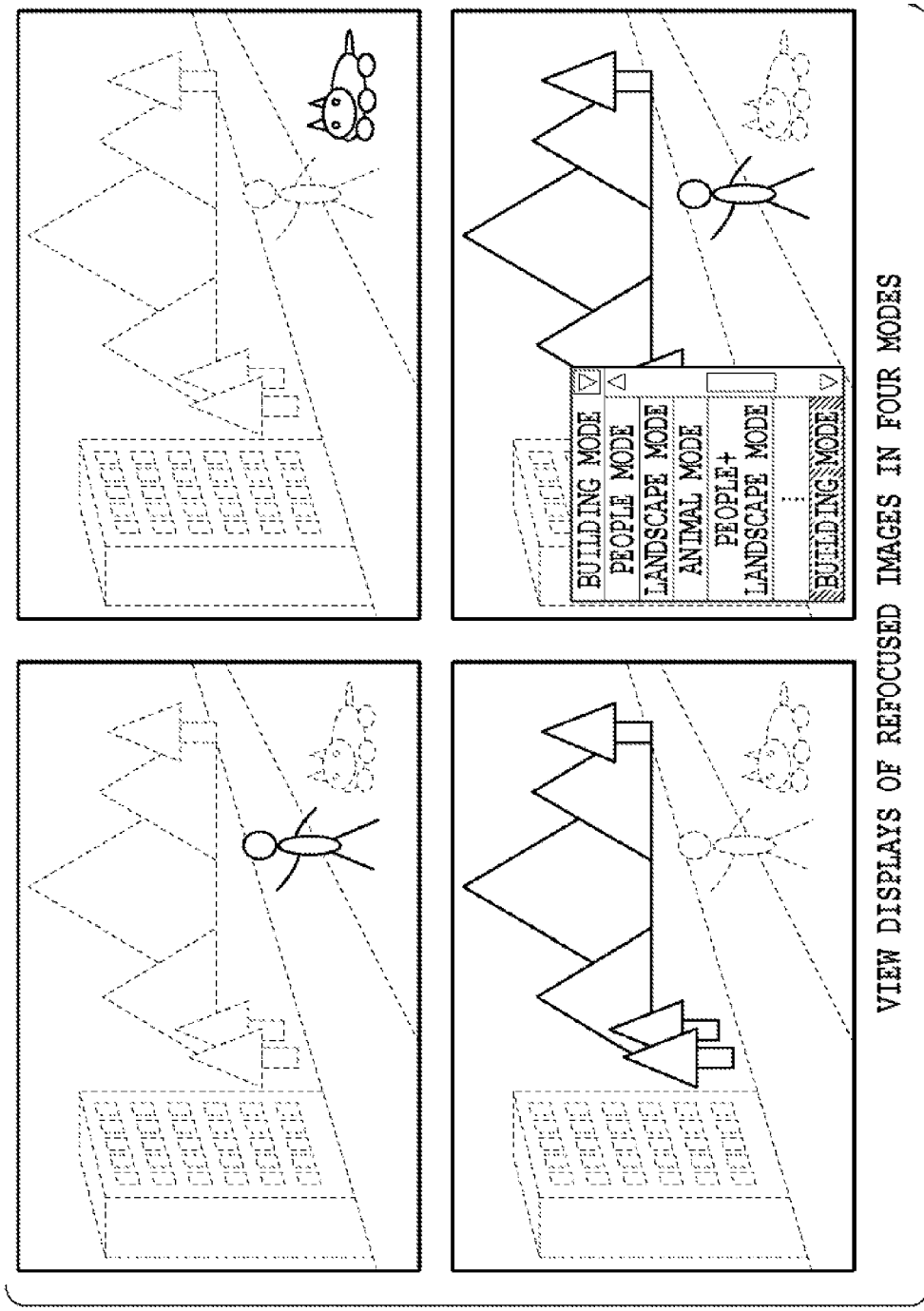
FIG.6A VIEW DISPLAYS OF REFOCUSED IMAGES IN FOUR MODES

IMAGE PROCESSING APPARATUS AND IMAGE PROCESSING METHOD

BACKGROUND OF THE INVENTION

1. Field of the Invention

The present invention relates to an image processing apparatus and an image processing method for processing an image data based on information obtained from a plurality of viewpoints.

2. Description of the Related Art

As a method for checking an image using an image-capturing device after the image is captured, a method is currently known in which the captured image is checked by displaying it using an interface such as a so-called reproduction mode shifting button.

Furthermore, a method is known in which an image is captured by switching the mode to the image capturing mode corresponding to an object of interest at the time of capturing an image. For example, an optimum imaging condition is automatically set for capturing an image in such a manner that an image is captured in a portrait mode in a case where a human is the object of interest, while capturing an image in a landscape mode in a case where a landscape is the object of interest.

A technology in relation to the region segmentation by means of the graph cutting method has been developed in recent years (Y. Boykov and M. P. Jolly, "Interactive Graph Cuts for Optimal Boundary & Region Segmentation of Objects in N-D Images," In International Conference on Computer Vision, volume 1, pages 105-112, July 2001). By means of this region segmentation technology, an image can be divided into regions by color to extract the amount of characteristic for each divided region, thereby recognizing the object for each region.

Furthermore, an image-capturing device employing a technique called the "light field photography" has been proposed in recent years (R. Ng, M. Levoy, M. Bredif, G. Duval, M. Horowitz, P. Hanrahan: "Light Field Photography with a Hand-held Plenoptic Camera", Stanford Tech Report CTSR 2005-02(2005)). This image-capturing device is composed of an image capturing lens, a microlens array, an image capturing element, and an image processing unit, wherein a captured image data obtained from the image capturing element contains information on light intensity distribution on a light receiving surface as well as information on the traveling direction of the light. Then, the image processing unit can reconstruct an observation image from a plurality of viewpoints and directions.

One of the reconstruction processing is to adjust a focus after capturing an image (hereinafter referred to as refocusing) (Japanese Patent Laid-open No. 2011-022796, for example). An image-capturing device capable of refocusing after taking an image has been developed (hereinafter referred to as a light field camera). Furthermore, a technology has been developed in which a deep-focus image is generated from images from a plurality of viewpoints.

A current light field camera carries out the refocusing by a user tapping on a position desired to be focused on a touch-panel type display screen in a reproduction mode so as to display a combined image in which the focus is adjusted on the display screen.

The current light field camera requires the tapping operation on the display screen to adjust the focus upon refocusing at the time of shifting to the reproduction mode. Therefore, in a case where an image of a person, for example, is captured several times by a light field camera and then the captured image is viewed in the reproduction mode, a need for an extra work has been created for adjusting the focus by carrying out the tapping operation each time the captured image is switched to another one if the person is out of focus by default.

SUMMARY OF THE INVENTION

An image processing apparatus according to the present invention is characterized by being provided with an obtaining unit configured to obtain a multi-view image data obtained by image-capturing in a plurality of viewpoints; a setting unit configured to set a mode indicating a target to be focused; and a generation unit configured to generate a combined image data focused on the target by executing image processing to the multi-view image data based on the mode set by the setting unit.

According to the present invention, setting a reproduction-refocus-mode makes it possible to automatically display an image focused on a designated target at the time of reproduction, which can save a user from having to execute an extra tapping operation.

Further features of the present invention will become apparent from the following description of exemplary embodiments (with reference to the attached drawings).

DESCRIPTION OF THE EMBODIMENTS

Detailed description will be made below with regard to embodiments of the present invention using drawings.

First Embodiment

Figure 1:
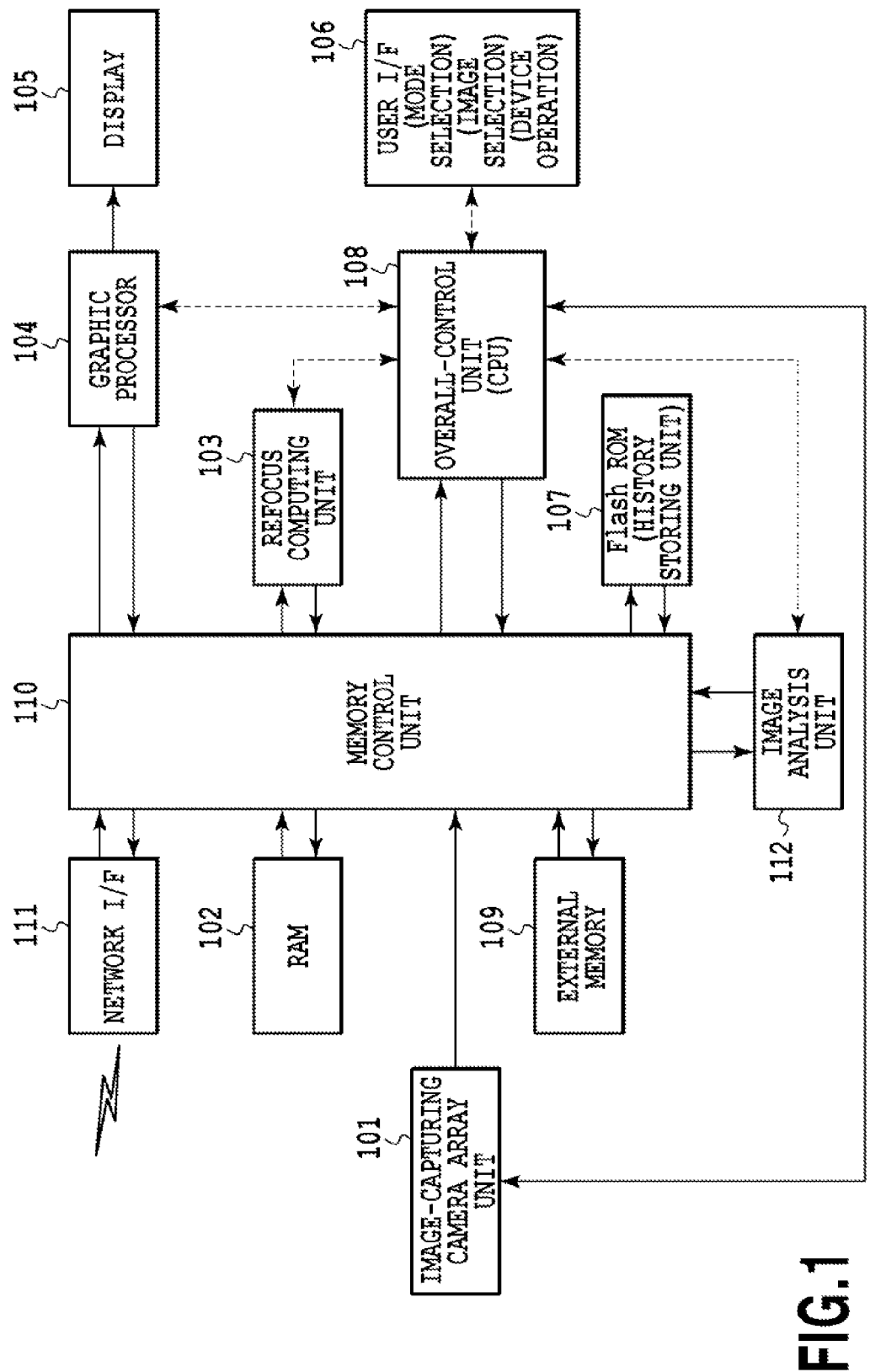
FIG. 1 is a block diagram showing an example of a hardware configuration of an entire camera array according to a first embodiment of the present invention.

FIG. 1 is a block diagram showing an example of a hardware configuration of an image processing apparatus of a first embodiment according to the present invention. Detailed description will be made below with regard to FIG. 1. A image-capturing camera array (as known as camera array system, multiple lens camera, and the like) unit 101 is an assemblage of a plurality of cameras independent of one another each of which is provided with an optical system and an image capturing element independent of one another. The image-capturing camera array unit 101 includes a control unit and the like of the image capturing element to output a group of output data from a plurality of image capturing elements as a multi-view image data.

A RAM 102 is a memory for use in temporary storage of the multi-view image data captured by the image-capturing camera array unit 101, temporary storage of a generated refocused image data, temporary storage of other data undergoing the computation processing, etc. A Flash ROM 107 is a nonvolatile memory which accumulates and stores images (types and positions) and histories regarding operations that have been selected by a user before. An external memory 109 is an external memory such as an SD card. The external memory 109 is also a nonvolatile memory which saves the image data even if a power supply is turned off. The external memory 109 saves the multi-view image data captured by the image-capturing camera array unit 101 as an image data in accordance with a predetermined image data format. The external memory 109 is also utilized as a region for temporarily storing the image data in processing as a temporary image file.

A memory control unit 110, which is composed of a so-called bus system and a control unit of a memory and a device connected to the bus system, controls reading/writing of the data from/to each of memories of the RAM 102, the Flash ROM 107, and the external memory 109, for example.

A user I/F (interface) 106 is an I/F (interface) for selecting the operation of equipment, selecting an image or a region on which a user wishes to refocus and display, or selecting the mode associated with displaying the image that has been already captured. Specifically, the user I/F 106 corresponds to a user I/F such as a touch panel arranged on a display 105, a shutter button, an operation dial, etc.

An overall-control unit (CPU) 108 carries out the control of the entire equipment, and the computing control in which most frequent region is selected based on the history information stored in the Flash ROM 107 to give an instruction to a refocus computing unit 103.

The refocus computing unit 103 generates a refocused image data from a multi-view image data in accordance with the instruction from the overall-control unit 108. An overview of generation of a combined image data from the multi-view image data by performing a refocus process will be described here. In the light field photography, the directions and intensity of the rays of light (a light field: hereinafter referred to as an "LF") passing through a plurality of positions in a space is calculated from the multi-view image data for each of the positions. Then, the image to be focused upon passing thought a virtual optical system to be formed on a virtual sensor is calculated using the obtained information of the LF. An appropriate setting of such virtual optical system and sensor enables the refocused image data to be generated. The refocus processing is not a prime purpose of the present invention, but a technique other than that described above may be used. The generated refocused image data is stored in the RAM 102 or the external memory 109, etc.

A graphic processor 104 is equipped with a function of displaying the refocused image data generated in the refocus computing unit 103 on the display 105. A network I/F 1110 establishes the network connection with the outside of the equipment to transfer data to and from the external equipment on the network.

An image analysis unit 112 detects a region of an object in the image data to assign an identification code for each region. The image analysis unit 112 stores the region information of the detected object and the identification code in the RAM 102. The object in the present embodiment is assumed to include not only a human and an animal that are the foreground, but a landscape contained in the background. The detection of the object can be implemented by utilizing some noticeable characteristics (such as two eyes, a mouth, and a nose) and the inherent geometric positional relationship among those characteristics, for example. Otherwise, the detection of the object also can be implemented by utilizing characteristic of the symmetry of a face, characteristic of color of face, template matching, neural network, etc. In order to detect the background, a face of a human or an animal is detected by means of, for example, the method described above to calculate the position and size thereof. The image can be divided into an object region containing the human in the image and a background region that is all other regions in the image, based on the calculated result. For example, assuming that the object region is a rectangle, the format of the region information is indicated by coordinates at the upper left and the lower right. Furthermore, although three kinds of characteristics, namely a human (or a face), an animal, and a landscape, are to be identified in the object, it is not limited to this, but it is possible to divide the image into further detailed classifications. In addition, a method of detecting and identifying the object is not a prime purpose of the present embodiment, and thus the technique other than that described above may be used. The object detection and identification function in the image analysis unit 112 is implemented immediately after capturing the image, and the result thereof is stored in a nonvolatile memory such as the RAM 102 and the external memory 109, for example.

In addition, the multi-view image data may be a RAW image data obtained from the image capturing element, or may be an image data after developed that has undergone development processing such as demosaicing, white balancing, gamma adjustment, noise reduction, etc. Furthermore, although the present embodiment has described the example of using the image-capturing camera array unit 101, what is necessary is that the multi-view image data is the data from a plurality of viewpoints. Thus, an image data obtained by, for example, using a microlens array may be used.

Next, processing for changing the reproduction-refocus-mode in the present embodiment will be described. The reproduction-refocus-mode refers to a reproduction mode in which an object to be refocused, i.e., a target to be focused is set, such as a landscape mode and a human mode.

The function of changing the reproduction-refocus-mode will be described using a hardware block configuration diagram in FIG. 1. The change of the reproduction-refocus-mode is instructed via the user I/F unit 106.

The overall-control unit 108 notifies the refocus computing unit 103 of the mode corresponding to the image to be reproduced at the time of shifting the mode to the reproduction mode. Furthermore, also in the case where the image is switched at the user I/F unit 106, the overall-control unit 108 notifies the refocus computing unit 103 of the mode corresponding to the image to be reproduced. Moreover, since the target to be recognized as an object varies in accordance with the reproduction-refocus-mode, the recognition information of the object of interest is notified to the image analysis unit 112 in a case where the reproduction-refocus-mode is changed.

The refocus computing unit 103 receives a notification from the overall-control unit 108 to read out a multi-view image data from the external memory 109, thereby generating a deep-focus image data. Also, a refocus computation in accordance with the reproduction-refocus-mode is carried out based on the result of analysis by the image analysis unit 112 to generate the refocused image data in accordance with the reproduction-refocus-mode.

The image analysis unit 112 analyzes the presence of the target to be recognized in the reproduction-refocus-mode designated by a user from the deep-focus image data generated by the refocus computing unit 103. If there is the target to be recognized in the reproduction-refocus-mode, the region information thereof is notified to the overall-control unit 108.

The graphic processor 104 displays the deep-focus image or the refocused image generated at the refocus computing unit 103 on the display 105 in response to the analysis result.

An operational flow according to the present embodiment will be described below in detail.

Figure 2:
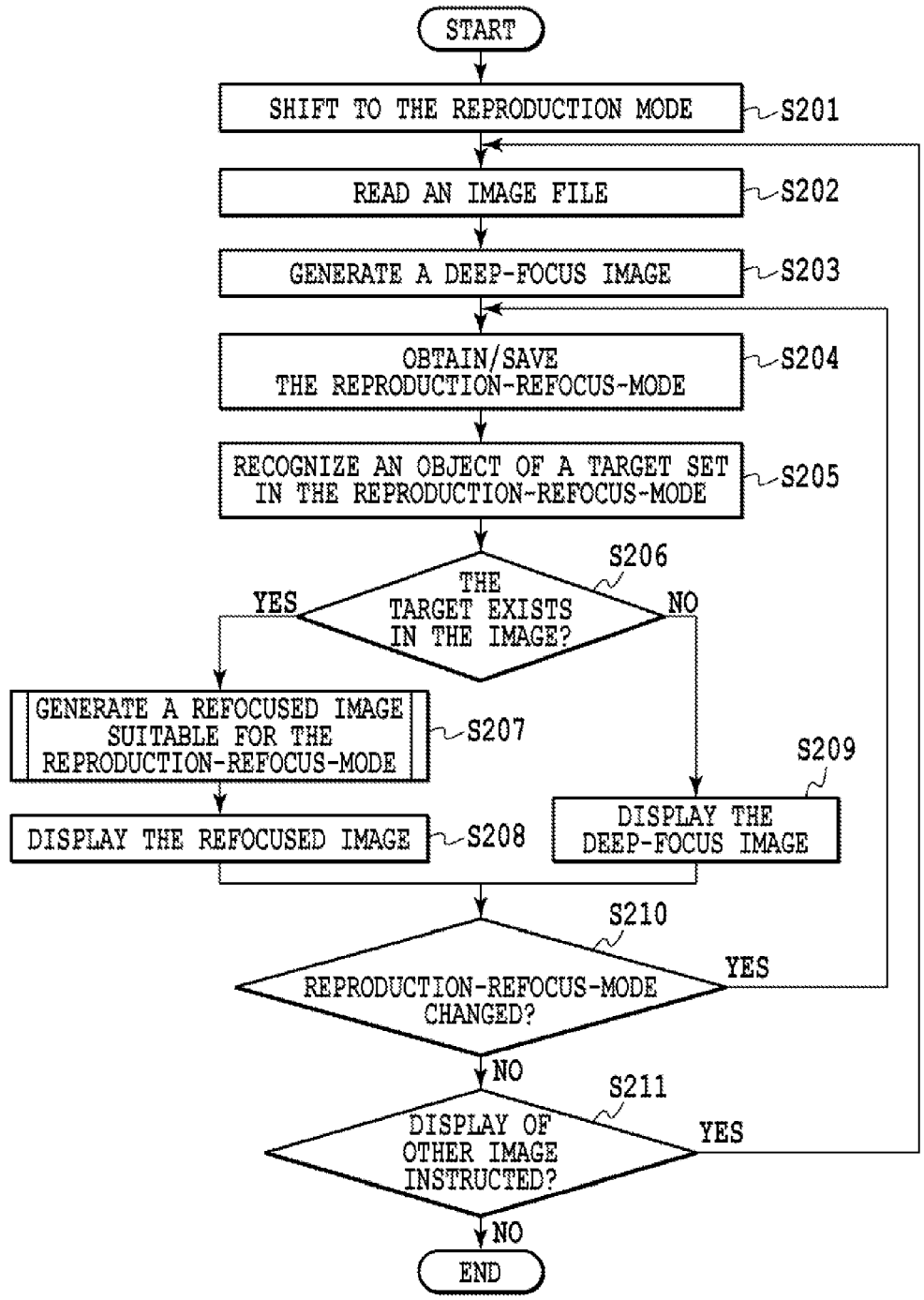
FIG. 2 is a flowchart showing an example of an operation of a reproduction-refocus-mode according to the first embodiment of the present invention.

FIG. 2 shows an operational flow chart upon changing the reproduction-refocus-mode. If an instruction for shifting the mode to the reproduction mode is given by a user in the operation of the user I/F 106 at step S201, the mode shifts to the reproduction mode and the procedure proceeds to step S202. It is conceivable that the procedure proceeds to step S201 in the following three cases, namely the cases of:
1. being in activation in the mode other than the reproduction mode, and then switching the mode to the reproduction mode;
2. being already in the reproduction mode at the time of activation; and
3. designating other image in the reproduction mode.

An image file for reproduction is read at step S202, and then the procedure proceeds to step S203. At step S203, the refocus computing unit 103 generates a deep-focus image data from the image file obtained at step S202, and then the procedure proceeds to step S204.

The current reproduction-refocus-mode designated by a user is obtained and saved at step S204, and then the procedure proceeds to step S205. Once set, the contents of the reproduction-refocus-mode are saved. In a case where the display is switched to the image of other imaging scene, the other image is displayed in the saved reproduction-refocus-mode without changing the mode. At step S205, the image analysis unit 112 carries out the processing to recognize the target to be recognized in the reproduction-refocus-mode designated by the user I/F 106, and then the procedure proceeds to step S206.

If the result of the recognition processing indicates the presence of the designated target to be recognized at step S206, the procedure proceeds to step S207. If there is no designated target to be recognized, the procedure proceeds to step S209.

A refocused image data suitable for the reproduction-refocus-mode is generated based on the analysis result at step S207, and then the procedure proceeds to step S208. At step S208, the refocused image indicated by the generated refocused image data is displayed on a display screen, and the procedure proceeds to step S210.

If it is determined that there is no target to be recognized in the image at step S206, a deep-focus image is displayed on the display screen and then the procedure proceeds to step S210.

If the reproduction-refocus-mode is changed by the operation by a user at step S210, the procedure proceeds to step S204 to change the setting of the reproduction-refocus-mode, thereby generating and displaying the refocused image data in accordance with the new reproduction-refocus-mode. More specifically, the reproduction-refocus-mode is changed from the first mode to the second mode while displaying the refocused image, a refocused image data in accordance with the second mode is generated and displayed. Since it is unnecessary to make any change in the display on the display 105 in a case where the reproduction-refocus-mode is not changed, the procedure proceeds to step S211 with the image unchanged.

If the change in the displayed image to another is instructed by a user operation at step S211, the procedure proceeds to step S202 to read the image file of the other image. After that, the refocused image data in accordance with the reproduction-refocus-mode saved at step S204 is generated and displayed on the display 105. If there is no instruction for changing the image to another, it is unnecessary to make any change in the display on the display 105, thereby terminating the procedure.

Figure 3A:
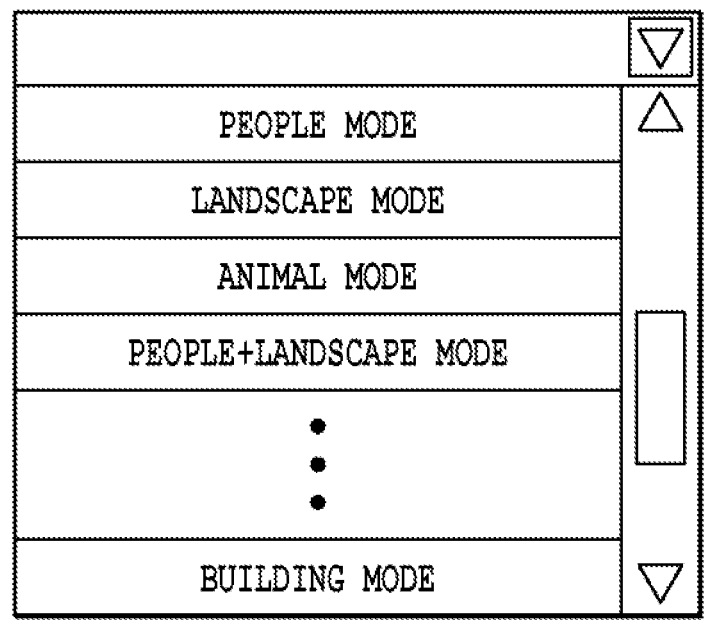
FIGS. 3A and 3B are diagrams showing an example of a user I/F for changing the mode to the reproduction-refocus-mode according to the first embodiment of the present invention.
Figure 3B:
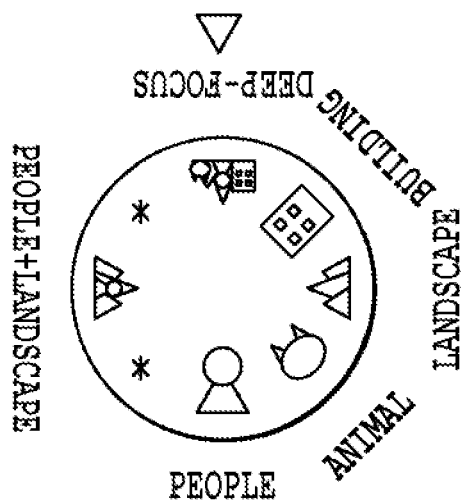

FIGS. 3A and 3B show an example of the user I/F for changing the reproduction-refocus-mode. The graphic processor 104 displays a pop-up menu shown in FIG. 3A on the display 105, and a user selects modes such as the "human mode", the "landscape mode", etc. The overall-control unit 108 thus can switch the reproduction-refocus-mode. Furthermore, FIG. 3B shows a dial arranged on a camera, and the overall-control unit 108 can switch the reproduction-refocus-mode in a case where a user turns the reproduction dial. For example, a deep-focus image is displayed in a case where the dial is turned to the "pan-focus mode", while displaying an image refocused on a human in a case where the dial is turned to the "human mode". The present embodiment has showed an example of the appearance of a pop-up combo box in FIG. 3A and the dial of the camera in FIG. 3B. However, the user I/F for changing the reproduction-refocus-mode is not limited to these, but an I/F may be used in which a virtual dial is displayed on a display screen to select the reproduction-refocus-mode. Furthermore, an I/F provided with a slider to select the reproduction-refocus-mode may be used. Moreover, user voice recognition may be employed for selecting the mode.

Figure 4A:
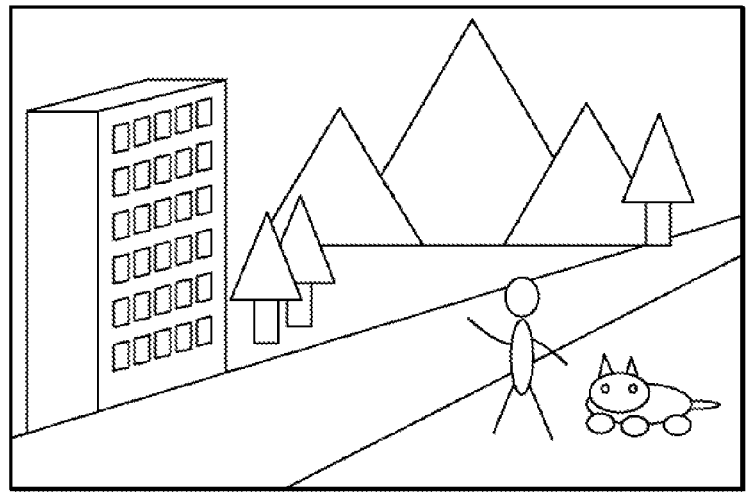
FIG. 4A to FIG. 4F are diagrams showing an example of an operation upon changing the mode to the reproduction-refocus-mode according to the first embodiment of the present invention.

FIGS. 4A to 4F are diagrams showing an example of the refocus operation by means of change in the reproduction-refocus-mode at step S210. First, FIG. 4A shows, for instance, an example in which a deep-focus image is displayed at step S209 in which all the bodies are well focused.

Figure 4B:
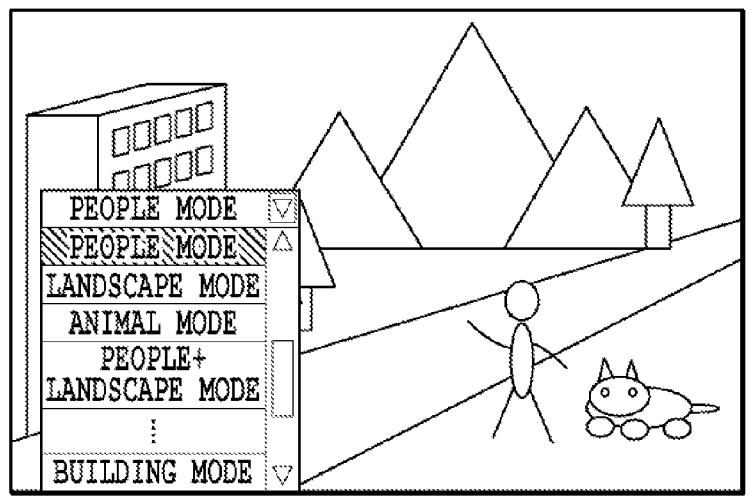

FIG. 4B shows the case where the reproduction-refocus-mode is changed while the deep-focus image in FIG. 4A is displayed on the display screen, in which a combo box is displayed. Furthermore, a user selects the "human mode" as the reproduction-refocus-mode.

Figure 4C:
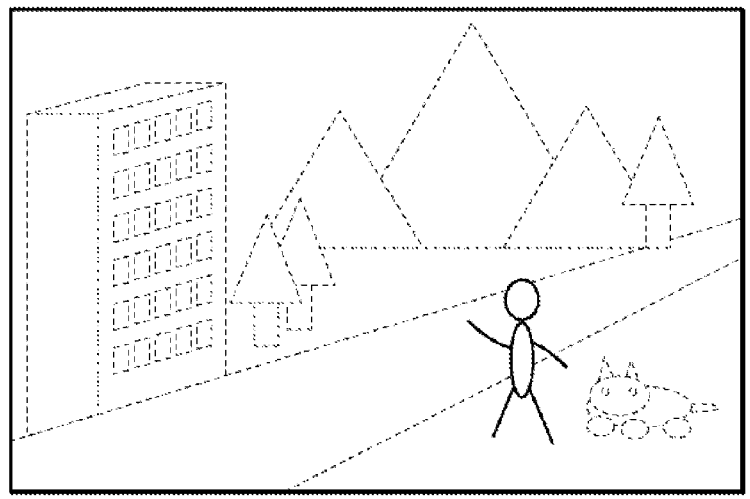

FIG. 4C shows the image after the refocus processing in a case where the reproduction-refocus-mode is set to be the "human mode," in which the image focused only on a human is displayed.

Figure 4D:
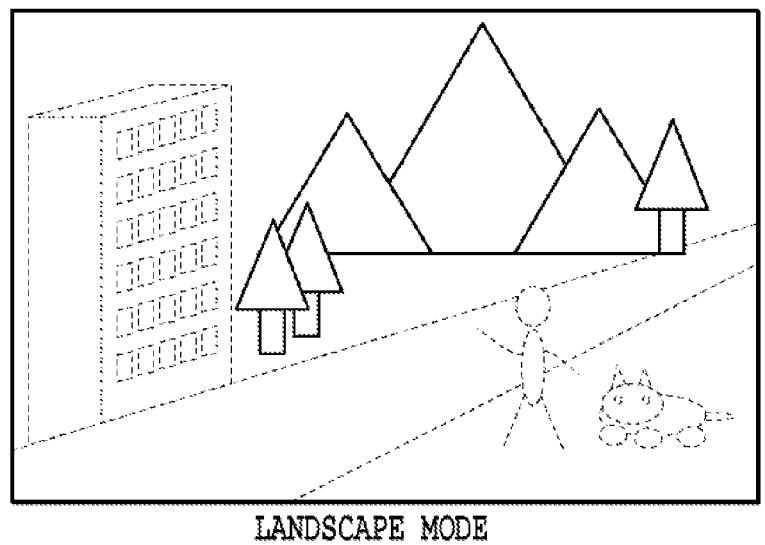

FIG. 4D shows the example in the case where the "landscape mode" is selected, in which the image refocused only on a landscape such as a mountain is displayed. For example, in a case where the mode shifts to the reproduction-refocusmode while the dial shown in FIG. 3B is set to the "landscape mode," this image is displayed by default.

Figure 4E:
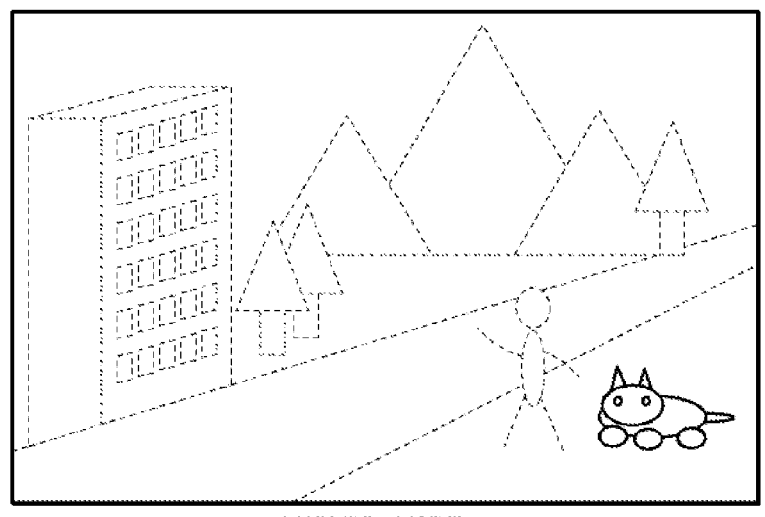

FIG. 4E shows the example in the case where the "animal mode" is selected, in which the image refocused on an animal at lower right is displayed.

Figure 4F:
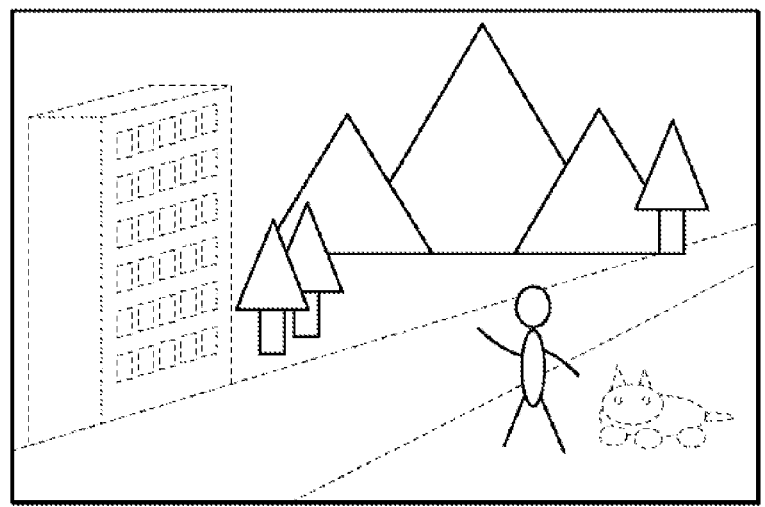

FIG. 4F shows the example in the case where the "human+ landscape mode" is selected, in which the image refocused on both a human and a landscape is displayed.

Figure 5A:
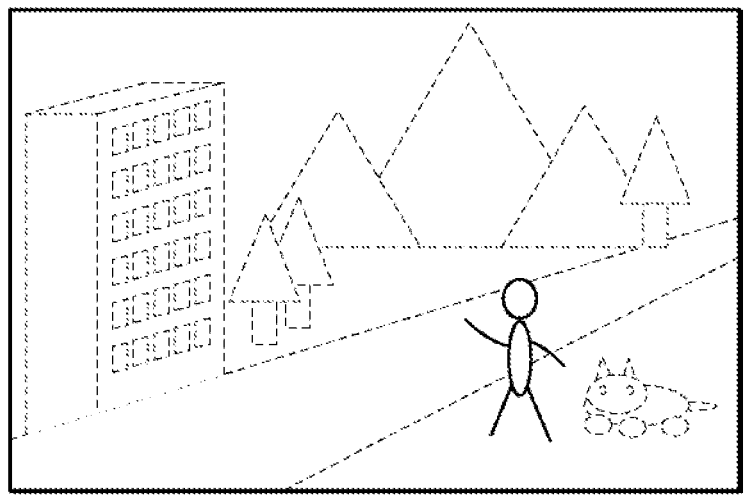
FIGS. 5A and 5B are diagrams showing an example of an operation in a reproduction-refocus-mode according to the first embodiment of the present invention.
Figure 5B:
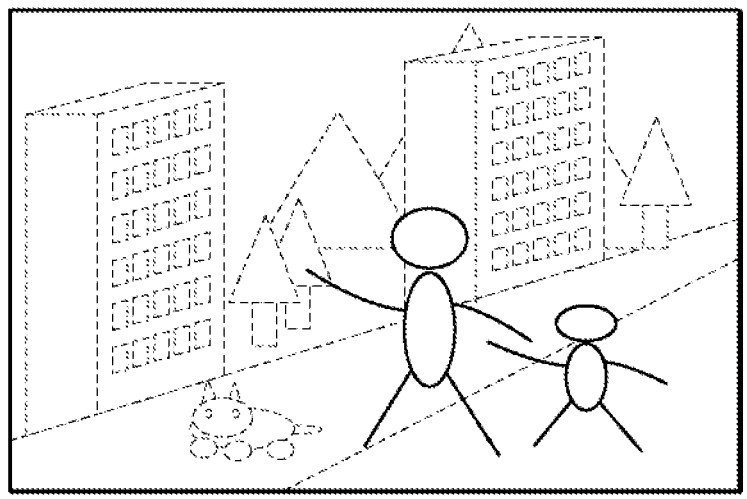

FIGS. 5A and 5B show the display examples in the case where the image is switched to another image by a user operation during the reproduction mode at step S211. More specifically, FIGS. 5A and 5B are examples in the case where a user provides an instruction on displaying an image file containing a multi-view image data of the other imaging scene than the displayed scene. First, in FIG. 5A, the reproduction-refocus-mode is set to the "human mode" in which the image refocused on a human is displayed. If the image data displayed is switched during the reproduction of this image, the image data refocused in the "human mode" is displayed as the image displayed after switched because the reproduction-refocus-mode is saved at step S204. The reproduction-refocus-mode is maintained even if the image is switched unless a user changes the reproduction-refocus-mode by intention.

Figure 8:
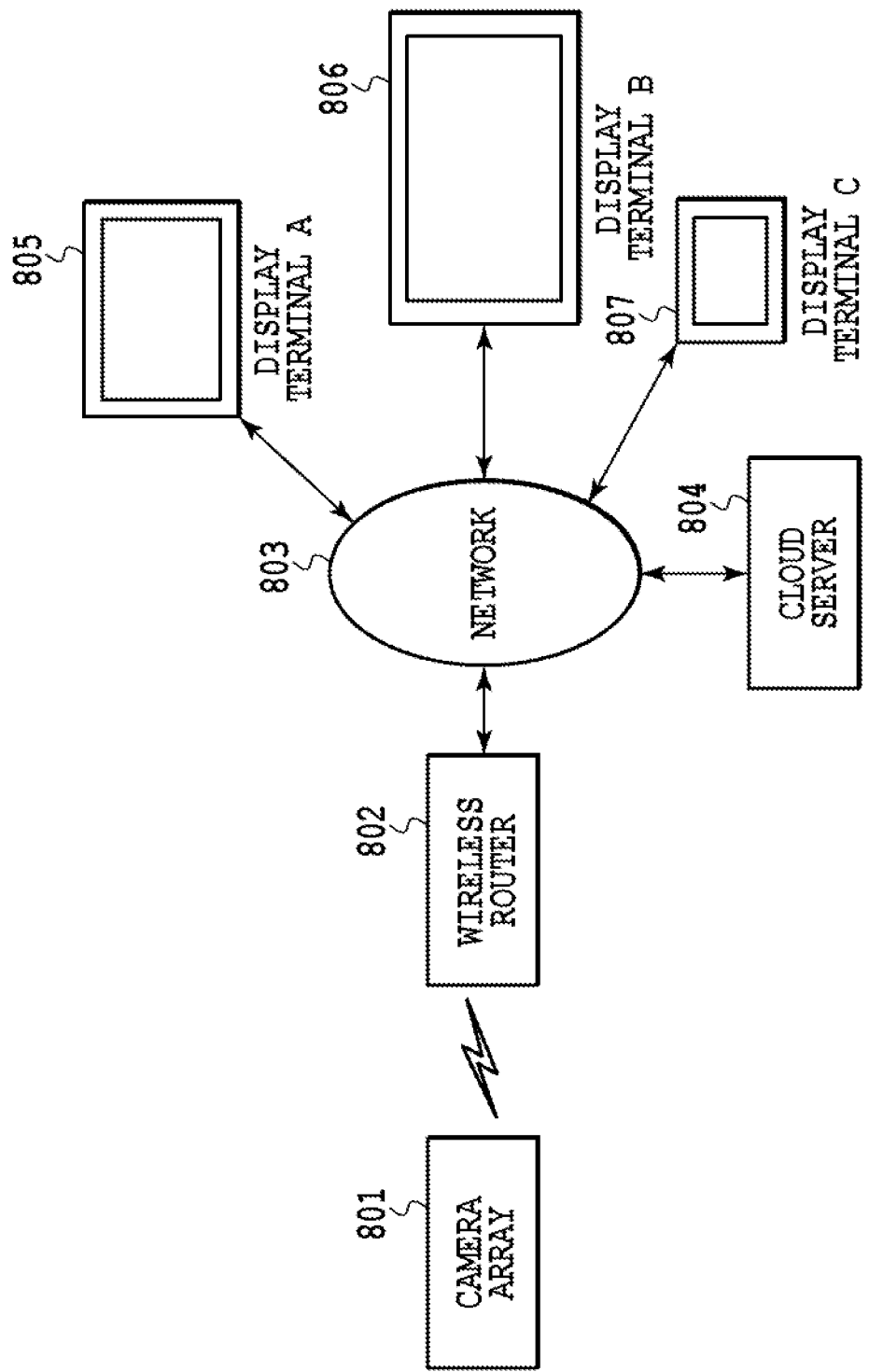
FIG. 8 is a diagram showing an example of other system configuration according to the first embodiment of the present invention.
Figure 9:
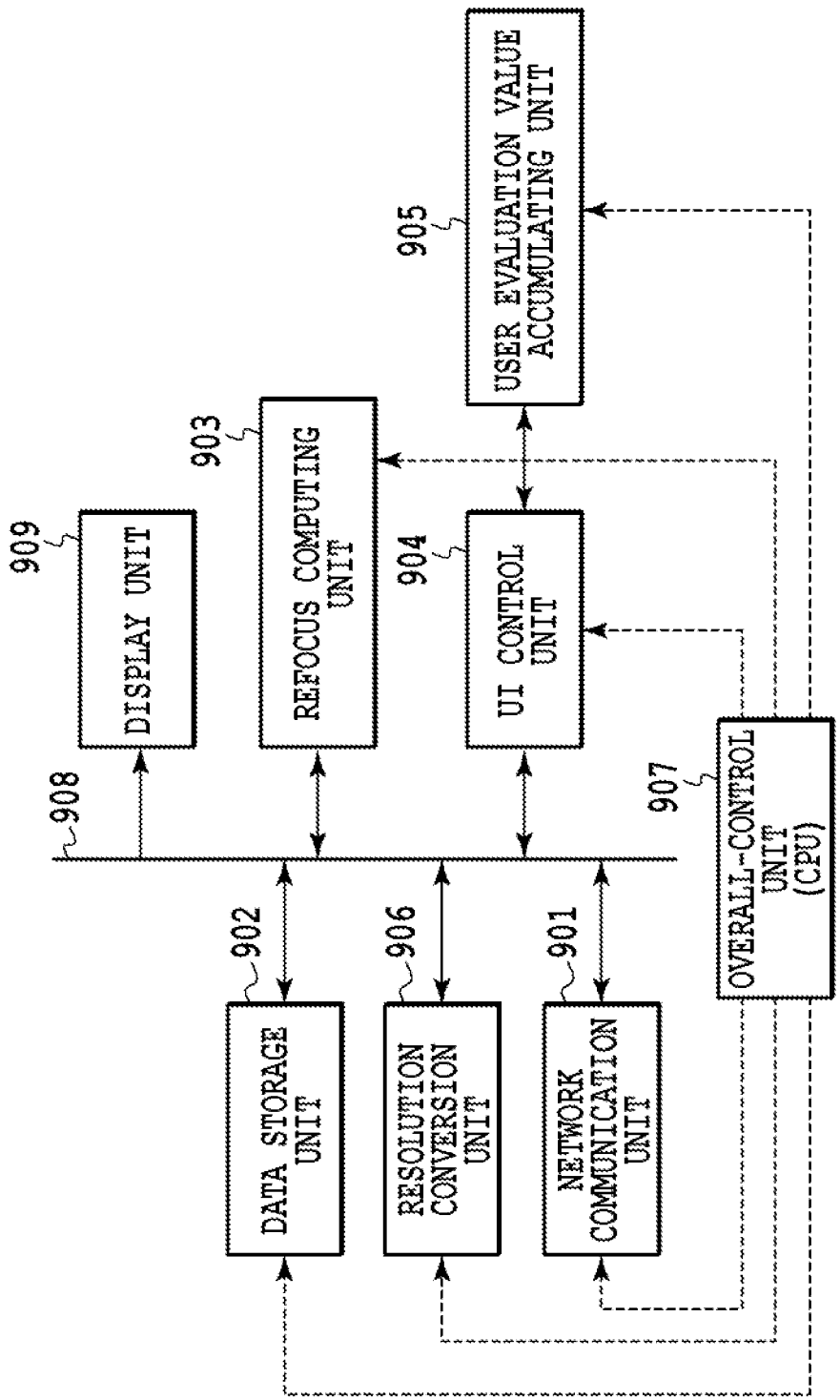
FIG. 9 is a diagram showing an example of a cloud server configuration according to the first embodiment of the present invention.
Figure 12:
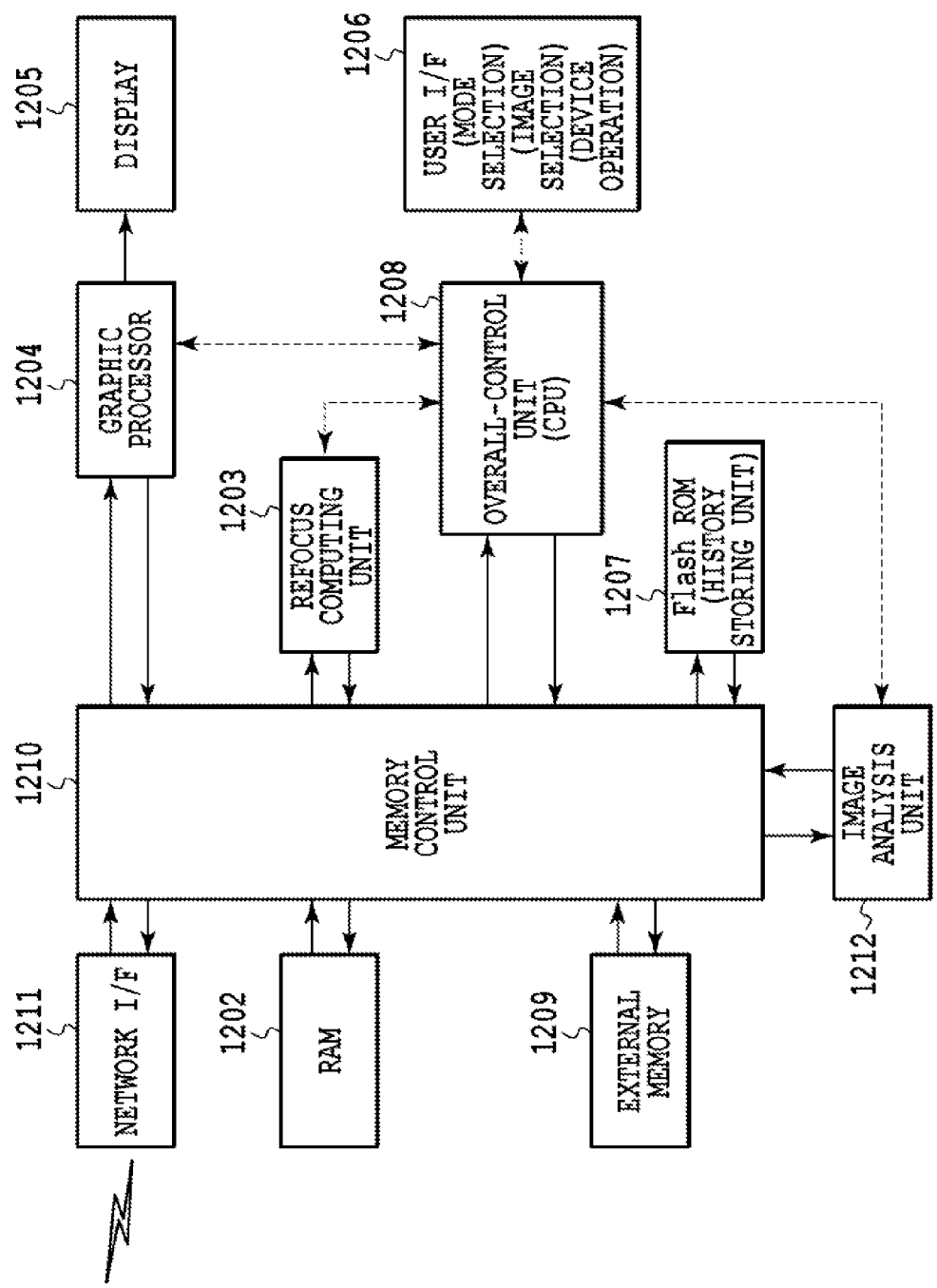
FIG. 12 is a diagram showing a structural example of a display apparatus according to the first embodiment of the present invention.

Although the first embodiment has been explained based on the hardware configuration shown in FIG. 1, in the present embodiment, as shown in FIG. 8, the hardware configuration shown in FIG. 1 can be applied to a system configuration including a network shown in FIG. 8. More specifically, processing of the image of the multi-view image data captured by a camera array 801 can be achieved in the components such as a cloud server 803 and display terminals 805 to 807. FIG. 12 shows a block diagram of the display terminals 805 to 807. In the block diagram shown in FIG. 12, the similar processing as that described in FIG. 1 can be executed except for obtaining of the multi-view image data via a network I/F. FIG. 9 shows the example of a detailed hardware configuration block diagram of the cloud server 804. In the cloud server 804, the function corresponding to the image analysis unit 112 in FIG. 1 may be carried out at the overall-control unit 907, or the analysis result from the camera array 801 and the display terminals 805 to 807 may be received via a network communication unit 901.

In the present embodiment, setting the reproduction-refocus-mode makes it possible to automatically display the image focused on the target designated at the time of reproduction, which can save a user from having to execute an extra tapping operation. For example, in a case where the image data containing images taken at a plurality of different imaging scenes is checked in the reproduction-refocus-mode, the mode can be set to the human mode if images are mainly human images such as a portrait. Since the image refocused on a human is thus displayed initially at the time of reproduction, the number of refocus by the tapping operation is reduced. Furthermore, the refocused image in accordance with the saved mode can be displayed without tapping operation by a user even if the image is switched to the image taken in the other imaging scene.

Conventionally, an image has to be captured for each mode in a case where the imaging mode is set at the time of capturing an image. In contrast, the reproduction-refocus-mode in the light field camera can generate the image focused on a human and the image focused on a landscape from a group of images taken in a single shooting, so that the refocused image can be checked for each mode without increasing the number of imaging.

Second Embodiment

Figure 6B:
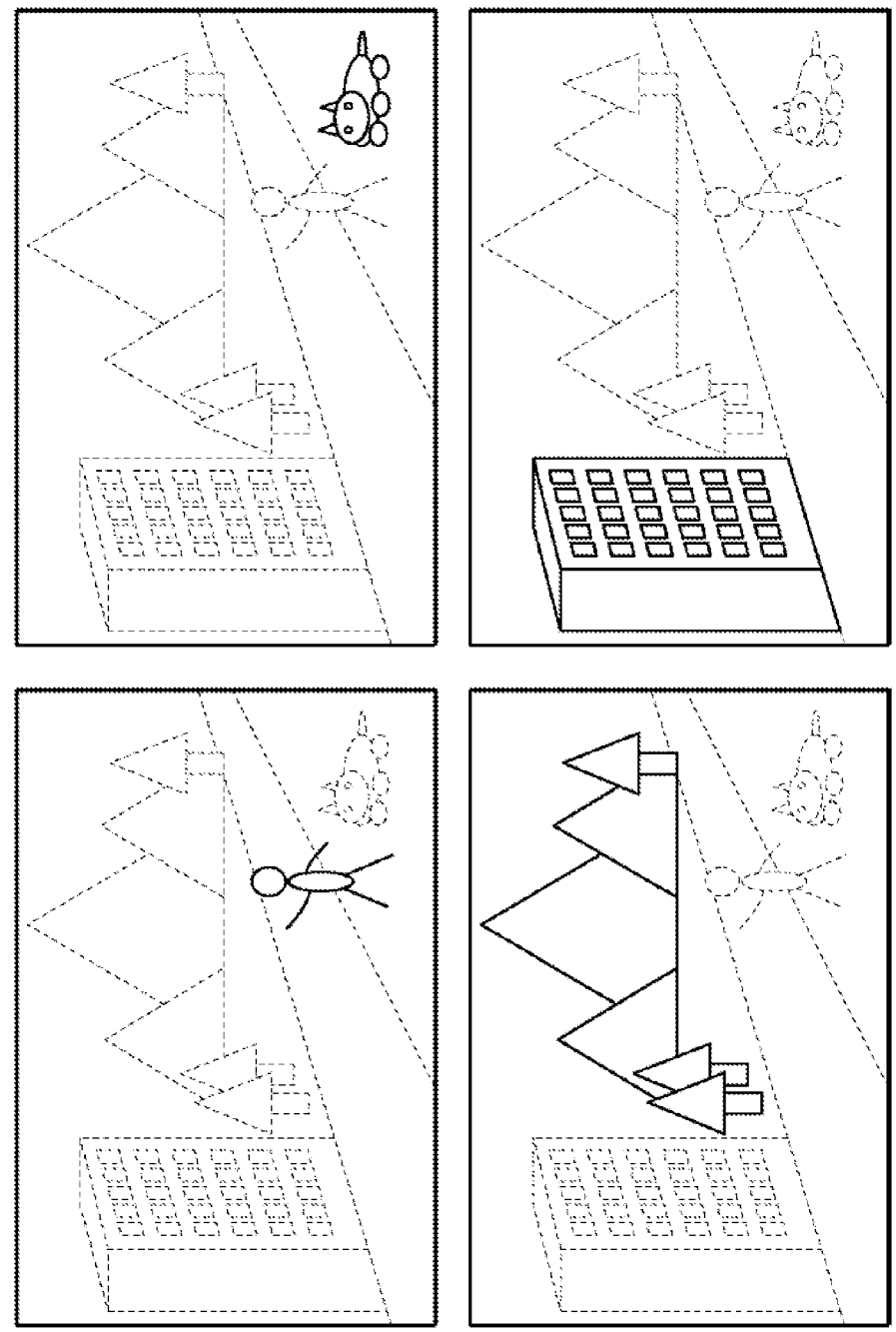
FIGS. 6A are 6B are diagrams showing an example of a dividing display function in the reproduction-refocus-mode according to a second embodiment of the present invention.

A second embodiment will describe an embodiment of dividing display function in reproduction mode in detail. FIGS. 6A and 6B show an example of divided display screen on the display 105 each showing the refocused image. The operational flows of each of divided views are pursuant to the flow chart shown in FIG. 2. Therefore, a user can set the reproduction-refocus-mode for each divided view. More specifically, the reproduction-refocus-mode can be set for each display region which is a plurality of divided regions on the display region on the display 105. Displaying of each divided view is controlled by the graphic processor 104.

FIG. 6A shows an example of a view display that is divided into four screens. The refocused image in the "human mode" is displayed at the upper left; the refocused image in the "animal mode" is displayed at the upper right; the refocused image in the "landscape mode" is displayed at the lower left; and the refocused image in the "human+landscape mode" is displayed at the lower right.

FIG. 6B shows the image of the processed result in which the view at the lower right shown in FIG. 6A is changed from the "human+landscape mode" to the "building mode," in which the refocused image of a building is displayed. The reproduction-refocus-mode is switched for each view, and thus the refocused images with different reproduction-refocus-modes are simultaneously displayed.

Figure 7A:
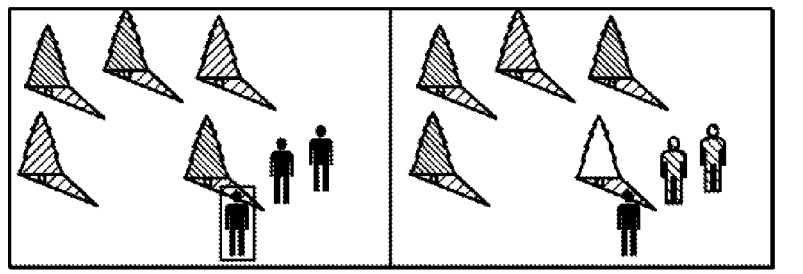
FIG. 7A to FIG. 7C are diagrams showing an example of a dividing display function in reproduction mode by a recommendation display function according to a second embodiment of the present invention.
Figure 7B:
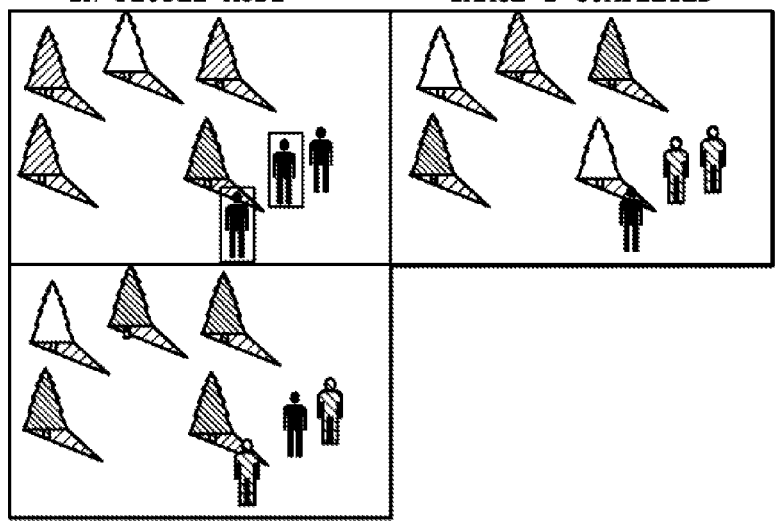
Figure 7C:
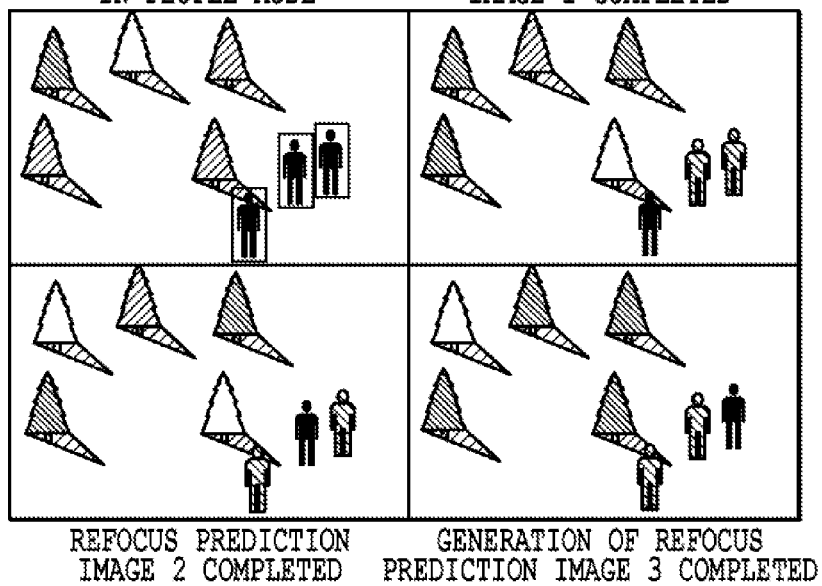

FIGS. 7A to 7C show an example of the dividing display function in reproduction mode on the display 105 using a refocus prediction function and a recommended region display function based on the history information. The refocus prediction function based on the history information is the processing for successively generating the refocused image data in descending order of frequency with reference to the history of refocus processing executed by a user before. The recommended region display function is the processing for displaying a predetermined graphical symbol to point out an object to be refocused in order to inform a user of the recommended position to be refocused. In the present embodiment, the order of the target to be focused is determined with reference to the history information, and the refocused image data is successively generated. Then, a recommended region frame is successively displayed on the focused target of the refocused image data after generation thereof has been completed. The example will be described.

The dividing display function in reproduction mode has the function of successively displaying a refocused image on the other view in a case where the refocused image data is generated to which the recommended region is displayed. The present embodiment will describe the example of dividing the display in four.

In FIG. 7A, a view on the left side shows an image reproduced in the human mode. In a case where a refocused image in the corresponding to the recommended region is generated, the recommended region frame is displayed at the same time a refocused image focused on that recommended region is displayed in a right view.

An image reproduced in the human mode is shown at the upper left in FIG. 7B, in which one more recommended region is newly added as compared with the status shown in FIG. 7A. A primarily-generated refocused image corresponding to the recommended region 1 is displayed at the upper right as shown in FIG. 7A. A secondarily-generated refocused image corresponding to a second recommended region 2 is shown at the lower left. In a case where the refocused image corresponding to the second recommended region is generated, a recommended region frame is displayed at the same time the refocused image is displayed.

An image reproduced in the human mode is shown at the upper left in FIG. 7C, in which one more recommended region is newly added as compared with the status shown in FIG. 7B. A primarily-generated refocused image corresponding to the recommended region 1 is displayed at the upper right as shown in FIG. 7B. A secondarily-generated refocused image corresponding to the recommended region 2 is displayed at the lower left as shown in FIG. 7C. A refocused image corresponding to a third recommended region is shown at the lower right. In a case where the refocused image corresponding to the third recommended region is generated, the recommended region frame is displayed at the same time the refocused image is displayed.

According to the present embodiment, the dividing display function in reproduction mode for the display switches the reproduction-refocus-mode for each view, so that it is possible for a user to simultaneously make a comparison between the refocused images in the different reproduction-refocus-modes, thereby improving the visibility.

Third Embodiment

Figure 10:
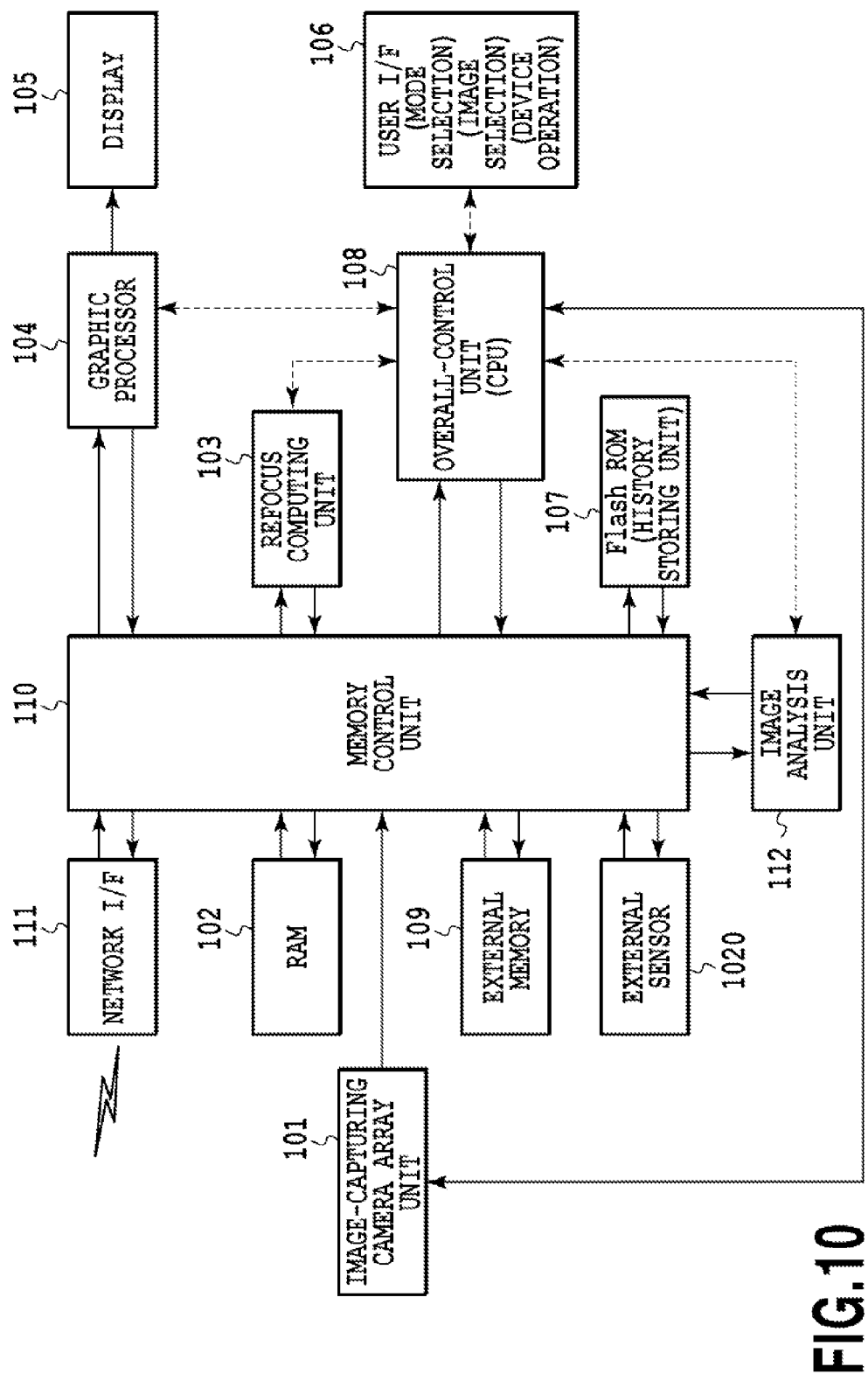
FIG. 10 is a block diagram showing an example of a hardware configuration according to a third embodiment of the present invention.

A third embodiment will describe another aspect of the change in the reproduction-refocus-mode. FIG. 10 is the hardware block configuration diagram shown in FIG. 1 to which an external sensor 1020 is added. The external sensor 1020 is the sensor capable of detecting an object, such as a human detection sensor. Sensor information is temporarily stored together with a captured image at the time of image capturing, and thus it is possible to determine the presence of, for example, a human from the sensor information at the time of reproduction. Therefore, in a case where the camera structured so as to be provided with such the external sensor 1020 is used to automatically add the sensor information to the multi-view image data, the refocused image data can be generated without the process of generation of the deep-focus image data described in the first embodiment. The configuration other than that described above can be the same as that shown in FIG. 1. An operational flow of the present embodiment will be described below in detail.

Figure 11:
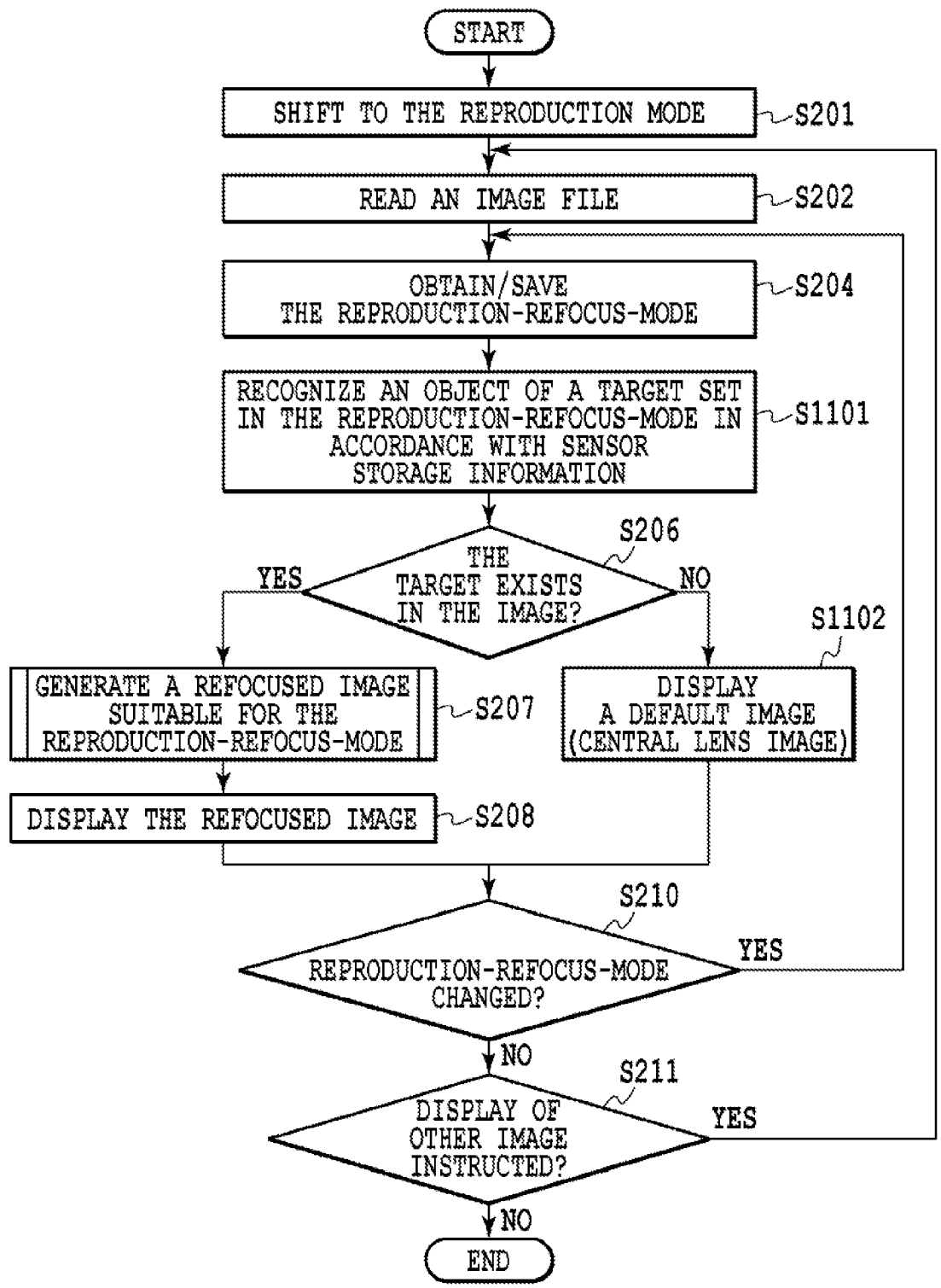
FIG. 11 is a flowchart showing an example of operation in the reproduction-refocus-mode according to the third embodiment of the present invention.

FIG. 11 shows the operational flow chart of the present embodiment. The operational flow in FIG. 11 is similar to that shown in FIG. 2 but step S203 is omitted and steps S205 and S209 are replaced with steps S1101 and S1102. The residual steps can execute the same processing as that shown in FIG. 2, so that the explanation of those steps are omitted.

At step S1101, the image analysis unit 112 utilizes the sensor information obtained from the external sensor 1020 to execute the recognition processing of the target to be recognized in the reproduction-refocus-mode that is designated by the user I/F 106, and the procedure proceeds to step S206. If the result of the recognition processing indicates the presence of the designated target at step S206, the procedure proceeds to step S207. If no designated target exists, the procedure proceeds to step S1102.

At step S1102, an image captured by, for example, a central lens of the image-capturing camera array unit 101 is displayed on the display screen as a default image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-130864, filed Jun. 8, 2012, which is hereby incorporated by reference herein in its entirety.

What is claimed is:

1. An image processing apparatus for outputting an image to be displayed by a display unit, the apparatus comprising:
a holding unit configured to hold a refocus image generated by performing image processing on multi-view image data indicating a plurality of images obtained by performing image-capturing from a plurality of different viewpoints, wherein the refocus image is an image with a focus adjusted from a focus of an image indicated by the multi-view image data after the image-capturing;
a setting unit configured to set a refocus mode indicating a kind of target to be focused in a refocus image to be displayed by the display unit; and
an outputting unit configured to read from the holding unit and output to the display unit, a refocus image which is focused on a target indicated by the refocus mode set by the setting unit,
wherein the outputting unit, in a case where a user instruction to switch an image displayed by the display unit from a first refocus image corresponding to a first imaging scene to a second refocus image corresponding to a second imaging scene different from the first imaging scene is input and a user instruction to change the refocus mode set by the setting unit is not input, outputs, as the second refocus image, a refocus image focused on a target indicated by the same refocus mode as the first refocus image to the display unit.

2. The image processing apparatus according to claim 1, further comprising:
a recognition unit configured to recognize an object contained in an image shown by the multi-view image data; and
a determination unit configured to determine whether the object recognized by the recognition unit corresponds to the refocus mode set by the setting unit, wherein:
the outputting unit outputs to the display unit, in a case where the determination unit determines that the object corresponds to the refocus mode set by the setting unit, the refocus image generated from the multi-view image data which is focused on the target indicated by the refocus mode set by the setting unit.

3. The image processing apparatus according to claim 2, wherein the outputting unit outputs a deep-focus image instead of the refocus image which is focused on the target in a case where the determination unit determines that the object does not correspond to the set refocus mode.

4. The image processing apparatus according to claim 1, wherein the setting unit sets the refocus mode for each display region, the each display region being created by dividing a display region of the display unit into a plurality of regions.

5. The image processing apparatus according to claim 1, further comprising:
a generation unit configured to generate the refocus image corresponding to the refocus mode set by the setting unit,
wherein the holding unit holds the refocus image generated by the generation unit and the outputting unit read from the holding unit and outputs to the display unit the refocus image generated by the generation unit.

6. The image processing apparatus according to claim 5, wherein:
the generation unit successively generates a refocus image for a recommended target in a case where a plurality of the targets to be focused are presented in the multi-view image data, and
the image processing apparatus further comprising:
a display control unit configured to successively display the generated refocus image in each of the regions created by dividing a display region of the display unit into the plurality of regions.

7. The image processing apparatus according to claim 1, further comprising the display unit configured to display the refocus image output by the outputting unit.

8. An image processing method for outputting an image to be displayed by a display unit, the method comprising the steps of:
storing a refocus image generated by performing image processing on multi-view image data indicating a plurality of images obtained by performing image-capturing from a plurality of different viewpoints to a holding unit, wherein the refocus image is an image with a focus adjusted from a focus of an image indicated by the multi-view image data after the image-capturing;
setting a refocus mode indicating kind of a target to be focused in a refocus image to be displayed by the display unit; and
reading from the holding unit and outputting to the display unit, a refocus image which is focused on a target indicated by the refocus mode set in the setting step,
wherein the outputting step includes, in a case where a user instruction to switch an image displayed by the display unit from a first refocus image corresponding to a first imaging scene to a second refocus image corresponding to a second imaging scene different from the first imaging scene is input and a user instruction to change the refocus mode set in the setting step is not input, outputting, as the second refocus image, a refocus image focused on a target indicated by the same refocus mode as the first refocus image to the display unit.

9. A program on a non-transitory computer-readable storage medium, the program causing a computer to execute the image processing method according to claim 8.

* * * * *